United States Patent
Zhang et al.

(10) Patent No.: US 8,792,066 B2
(45) Date of Patent: Jul. 29, 2014

(54) LIQUID CRYSTAL DISPLAY MODULE AND FRONT FRAME STRUCTURE THEREOF

(75) Inventors: Yanxue Zhang, Shenzhen (CN); Yicheng Kuo, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 51 days.

(21) Appl. No.: 13/203,844

(22) PCT Filed: May 22, 2011

(86) PCT No.: PCT/CN2011/074484
§ 371 (c)(1),
(2), (4) Date: Aug. 30, 2011

(87) PCT Pub. No.: WO2012/151764
PCT Pub. Date: Nov. 15, 2012

(65) Prior Publication Data
US 2012/0287367 A1    Nov. 15, 2012

(30) Foreign Application Priority Data
May 9, 2011 (CN) .......................... 2011 2 0144520

(51) Int. Cl.
*G02F 1/1333* (2006.01)
(52) U.S. Cl.
USPC ........................................................ 349/58

(58) Field of Classification Search
USPC ............................................................ 349/58
See application file for complete search history.

(56) References Cited

U.S. PATENT DOCUMENTS

| | | | | |
|---|---|---|---|---|
| 6,061,231 A | * | 5/2000 | Crockett | 361/679.26 |
| 7,847,879 B2 | * | 12/2010 | Choi | 349/58 |
| 2010/0245710 A1 | * | 9/2010 | Kim | 349/58 |

FOREIGN PATENT DOCUMENTS

| | | |
|---|---|---|
| CN | 1435713 A | 8/2003 |
| CN | 1637500 A | 7/2005 |
| CN | 200997031 Y | 12/2007 |
| CN | 101737735 A | 6/2010 |
| CN | 201637970 U | 11/2010 |

* cited by examiner

*Primary Examiner* — Richard Kim
(74) *Attorney, Agent, or Firm* — Sughrue Mion, PLLC (57) ABSTRACT

The present invention provides a liquid crystal display (LCD) module and a front frame structure thereof. The LCD module comprises a backlight module, a liquid crystal panel and a front frame structure. The front frame structure comprises a plurality of corner frame components, and the corner frame component comprises a top portion, a first side portion and a second side portion, all of which are perpendicular to each other. Each of the corner frame components is fixed on one corner of the backlight module, so as to fix the liquid crystal panel on the backlight module. The present invention can save material and achieve the object of the compactness design, and can fit different size specifications of the LCD module.

8 Claims, 7 Drawing Sheets

Fig. 1

PRIOR ART

LIQUID CRYSTAL DISPLAY MODULE AND FRONT FRAME STRUCTURE THEREOF

FIELD OF THE INVENTION

The present invention relates to a liquid crystal display (LCD) module and a front frame structure thereof, and more particularly to a LCD module having a segmented type of front frame structure.

BACKGROUND OF THE INVENTION

A liquid crystal display (LCD) is a kind of flat panel display (FPD) which displays images by the property of the liquid crystal material. In comparison with other display devices, the LCD has the advantages in lightweight, compactness, low driving voltage and low power consumption, and thus has already become the mainstream product in the whole consumer market. However, the liquid crystal material of the LCD cannot emit light by itself, and must depend upon an external light source. Thus, the LCD further has a backlight module to provide the needed light source.

Generally, the backlight module can be divided into two types: a side-light type backlight module and a direct-light type backlight module. In the side-light type backlight module, the light of the light source is emitted into a light guide plate from one side thereof, and is outputted from a top surface thereof by a specific reflection of the light guide plate. On the other hand, the direct-light type backlight module does not include the light guide plate, and outputs the light of the light source through a lower reflective plate and an upper diffusion plate.

The backlight module is assembled by various components, such as a back plate, light sources, a lamp shade, a reflector plate, a light guide plate, a diffusion sheet, a brightness enhancement film and a plastic frame. In general, a liquid crystal panel is assembled on the backlight module, so as to form the LCD module.

Figure 1:
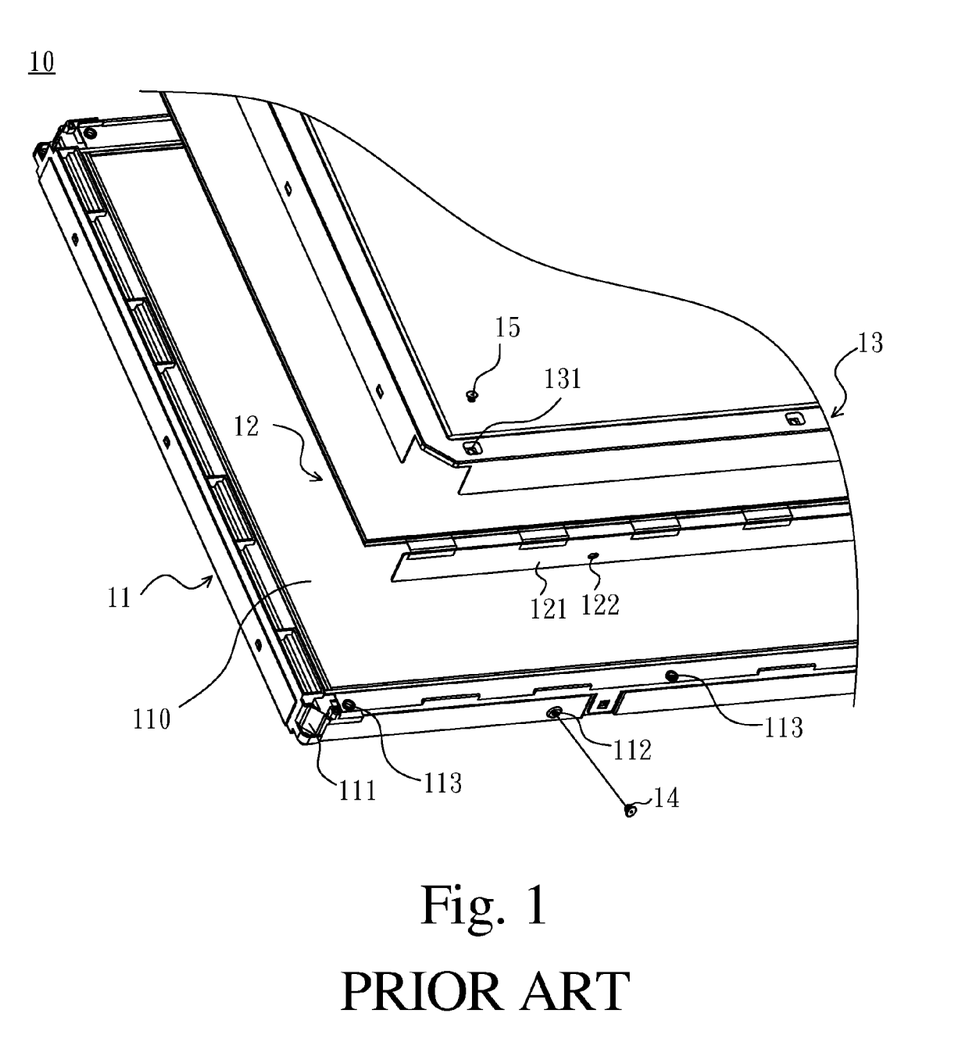
FIG. 1 is a partially exploded perspective view of a traditional LCD module.

Referring now to FIG. 1, a partially exploded perspective view of a traditional LCD module is illustrated, wherein a LCD module 10 substantially comprises a backlight module 11, a liquid crystal panel 12, a front frame 13, a plurality of first screws 14 and a plurality of second screws 15. The backlight module 11 has a plurality of optical films 110 and a plastic frame 111. The plastic frame 111 is a rectangular outer housing, wherein a back plate and a plurality of light sources (not shown) are first received in the plastic frame 111, and then the optical films 110 are disposed on the back plate in the plastic frame 111. Furthermore, the plastic frame 111 has at least one side surface formed with a plurality of first screw holes 112, while the plastic frame 111 further has an upper surface formed with a plurality of second screw holes 113. The liquid crystal panel 12 has a driver circuit board 121 on at least one side thereof, wherein the driver circuit board 121 has a plurality of driver ICs and a plurality of openings 122 formed on suitable positions thereof. The front frame 13 is a rectangular outer frame, and the front frame 13 has an upper surface formed with a plurality of installation holes 131.

In installation, the liquid crystal panel 12 is first disposed on the backlight module 11, and the first screws 14 pass through the openings 122 of the driver circuit board 121 for screw-connecting with the first screw holes 112 formed on the side surface of the plastic frame 111. Subsequently, the front frame 13 is pressed and disposed on the liquid crystal panel 12, and the second screws 15 pass through the installation holes 131 on the upper surface of the front frame 13 for screw-connecting with the second screw holes 113 on the upper surface of the plastic frame 111. Therefore, by using the first screws 14 and the second screws 15, the backlight module 11, the liquid crystal panel 12 and the front frame 13 can be assembled as one-piece to form the LCD module 10.

However, in actual installation, there are still some problems existing in the traditional LCD module 10 described, as follows: Each of traditional mass-produced LCD module 10 needs to develop corresponding size and type of the front frame 13. Moreover, with the continuous increase of types and sizes of LCD panels, the sizes and material of the front frame 13 is also correspondingly increased. Because the front frames 13 with various sizes can not be used in common, new molds for manufacturing the front frame 13 have to be continuously developed, so as to cause the increase of the developing cost. Besides, the front frame 13 is almost made of the steel, that causes the front frame 13 is bigger in the volume and heavier in the weight, and then it is also disadvantage in the compactness design of the LCD module 10.

As a result, it is necessary to provide a liquid crystal display module and a front frame structure thereof to solve the problems existing in the conventional technologies, as described above.

SUMMARY OF THE INVENTION

The present invention provides a liquid crystal display (LCD) module and a front frame structure thereof, so as to solve the problems that the front frames can not be universally used to cause the increase of the development cost, the volume of the front frame and the weight thereof and thus be disadvantageous for the compactness design of the LCD module.

A primary object of the present invention is to provide a liquid crystal display module and a front frame structure thereof, wherein the front frame structure of the LCD module comprises a plurality of corner frame components, and the corner frame component comprises a top portion, a first side portion and a second side portion, all of which are perpendicular to each other. Each of the corner frame component is fixed on one corner of the backlight module, and the liquid crystal panel is fixed on the backlight module by the corner frame components, so as to be assembled into the LCD module.

A secondary object of the present invention is to provide a liquid crystal display module and a front frame structure thereof, wherein the front frame structure further comprises a plurality of middle frame components, so as to connect between the adjacent corner frame components.

To achieve the above object, the present invention provides a liquid crystal display (LCD) module, comprising a backlight module, a liquid crystal panel and a front frame structure, and the liquid crystal panel is disposed on a top surface of the backlight module; the front frame structure comprises a plurality of corner frame components; the corner frame component comprises:

a top portion being a plate and having a first edge and a second edge, both of which are perpendicular to each other;

a first side portion being a portion vertically extended from the first edge of the top portion downward; and a second side portion being another portion vertically extended from the second edge of the top portion downward;

wherein the top portion, the first side portion and the second side portion are perpendicular to each other; each of the corner frame components is fixed on one corner of the backlight module; and the liquid crystal panel is fixed on the backlight module by the corner frame components, so as to be assembled into the LCD module.

To achieve the above object, the present invention further provides a front frame structure of a liquid crystal display (LCD) module, wherein a liquid crystal display module comprising a backlight module, a liquid crystal panel and a front frame structure, and the liquid crystal panel is disposed on a top surface of the backlight module; the front frame structure comprises a plurality of corner frame components; the corner frame component comprises:

a top portion being a plate and having a first edge and a second edge, both of which are perpendicular to each other;

a first side portion being a portion vertically extended from the first edge of the top portion downward; and a second side portion is a portion vertically extended from the second edge of the top portion downward;

wherein the top portion, the first side portion and the second side portion are perpendicular to each other; each of the corner frame components is fixed on one corner of the backlight module; and the liquid crystal panel is fixed on the backlight module by the corner frame components, so as to be assembled into the LCD module.

In one embodiment of the present invention, the top portion of the corner frame component is provided with at least one assembling hole, and the backlight module is correspondingly provided with at least one fixing hole, wherein at least one fixing component passes through the assembling hole to fix the corner frame component.

In one embodiment of the present invention, the fixing hole is a thread hole, and the fixing component is a screw bolt.

In one embodiment of the present invention, the corner frame component is provided with a first engaging portion, and the backlight module is correspondingly provided with a second engaging portion, so as to fix the corner frame component by the engagement of the first engaging portion and the second engaging portion.

In one embodiment of the present invention, the front frame structure further comprises a plurality of middle frame components, so as to connect between the adjacent corner frame components; the middle frame component comprises a first flat and a second flat, both of which are perpendicular to each other, the first flat is connected with the corresponding top portion of the adjacent corner frame component, and the second flat is connected with the corresponding first side portion or the second side portion of the corner frame component.

In one embodiment of the present invention, the front frame structure further comprises a plurality of middle frame assembles to connect between the adjacent corner frame components; the middle frame assemble comprises a plurality of middle frame components, and each of the middle frame components comprises a first flat and a second flat, both of which are perpendicular to each other; the first flat of the middle frame component is connected with the corresponding top portion of the adjacent corner frame component or another adjacent first flat of the middle frame component; and the second flat of the middle frame component is connected with the corresponding first side portion or the second side portion of the adjacent corner frame component, or is connected with another adjacent second flat of the middle frame component.

The liquid crystal display (LCD) module and the front frame structure thereof according to the present invention can fix the liquid crystal panel on the backlight module by the corner frame components, so as to be assembled into the LCD module. It can save material and achieve the object of compactness design. Besides, the front frame structure can fit different sizes and types of the LCD module, so as to lower the cost of development, to short the cycle time of development, and to decrease the manufacture cost. Furthermore, the middle frame component can be designed as different length to fit the liquid crystal display module having different sizes and types, so as to achieve an object that is to assist with fixing the liquid crystal panel on the backlight module.

DETAILED DESCRIPTION OF THE PREFERRED EMBODIMENTS

The foregoing objects, features and advantages adopted by the present invention can be best understood by referring to the following detailed description of the preferred embodiments and the accompanying drawings.

The description of the preferred embodiments refers to the drawings, so as to illustrate the specific embodiments of the present invention which can be carried out. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 2:
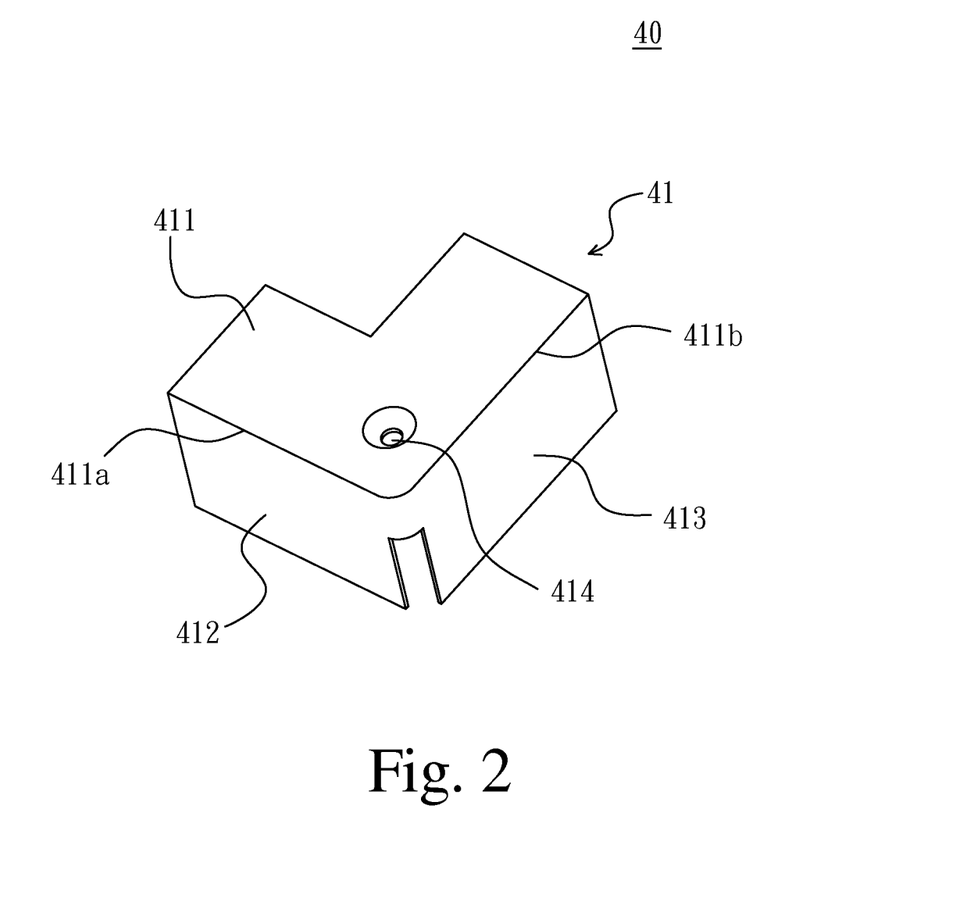
FIG. 2 is a perspective view of a front frame structure of a LCD module according to a first preferred embodiment of the present invention.
Figure 3:
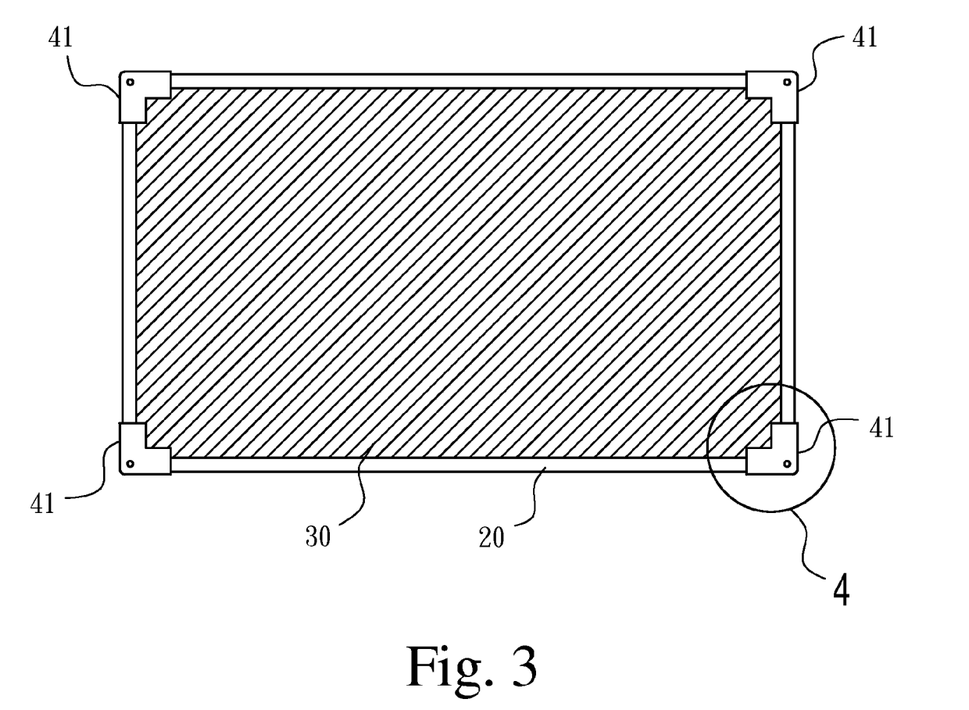
FIG. 3 is a top view of the LCD module according to the first preferred embodiment of the present invention.
Figure 4:
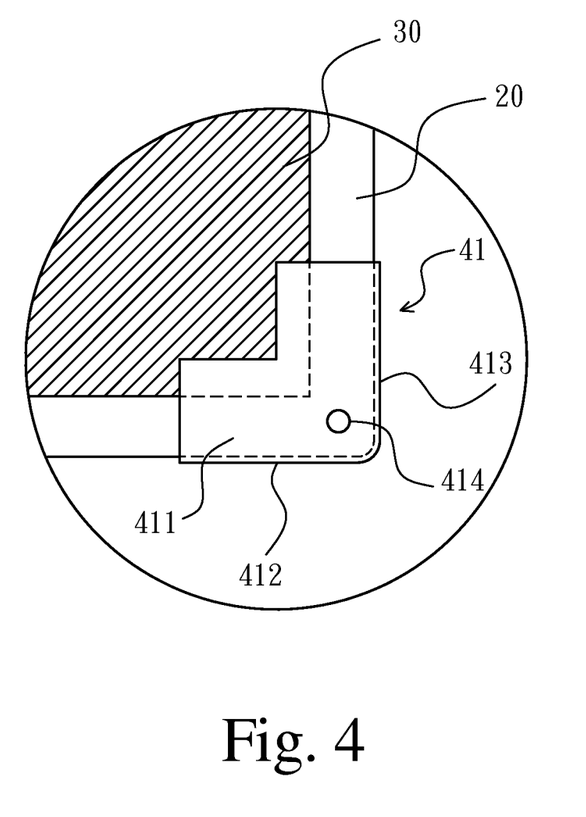
FIG. 4 is a partially enlarged view of the FIG. 3.

Referring now to FIGS. 2, 3 and 4, a perspective view of a front frame structure of a liquid crystal display (LCD) module according to a first preferred embodiment of the present invention is illustrated in FIG. 2; a top view of a LCD module according to the first preferred embodiment of the present invention is illustrated in FIG. 3; and a partially enlarged view of the FIG. 3 is illustrated in FIG. 4. As shown in FIG. 3, a LCD module of the present invention comprises a backlight module 20, a liquid crystal panel 30 and a front frame structure 40, wherein the liquid crystal panel 30 is disposed on a top surface of the backlight module 20 (in FIG. 3 and FIG. 4, the liquid crystal panel 30 is filled with slash lines for the convenience of differentiation), and the front frame structure 40 is disposed on the backlight module 20 and the liquid crystal panel 30 for fixing the liquid crystal panel 30 on the backlight module 20. The front frame structure 40 comprises a plurality of corner frame components 41.

As shown in FIG. 2, the corner frame component 41 comprises a top portion 411, a first side portion 412 and a second side portion 413. The top portion 411 is a plate and has a first edge 411a and a second edge 411b, both of which are perpendicular to each other; The first side portion 412 is a portion vertically extended from the first edge 411a of the top portion 411 downward; the second side portion 413 is another portion vertically extended from the second edge 411b of the top portion 411 downward. Besides, the top portion 411, the first side portion 412 and the second side portion 413 are perpendicular to each other.

As shown in FIG. 3 and FIG. 4, each of the corner frame components 41 is fixed on one corner of the backlight module 20, and the liquid crystal panel 30 is fixed on the backlight module 20 by the corner frame components 41, so as to be assembled into the LCD module.

Furthermore, the number of the front frame structure 40 of the LCD module is not limited in the present invention. Preferably, as shown in FIG. 3, one of the four corners of the LCD module 20 provides one of the corner frame components 41, respectively. However, in a certain case, it needs at last two corner frame components 41 installed on diagonal positions to stably fix the liquid crystal panel 30 on the backlight module 20.

Moreover, a method for fixing the corner frame component 41 is not limited in the present invention. Preferably, the top portion 411 of the corner frame component 41 is provided with at least one assembling hole 414, and the backlight module 20 is correspondingly provided with a fixing hole (not shown), so that at least one fixing component (not shown) can pass through the assembling hole 414 to fix the corner frame component 41. For example, the fixing hole is a thread hole, and the fixing component is a screw bolt. Otherwise, the corner frame component 41 is maybe fixed by means of engagement. For example, the corner frame component is provided with a first engaging portion (not shown), and the backlight module is correspondingly provided with a second engaging portion (not shown), so as to fix the corner frame component 41 by the engagement of the first engaging portion and the second engaging portion.

Because the front frame structure 40 of the preferred embodiment of the present invention comprises a plurality of the corner frame components 41 and the corner frame component 41 comprises the top portion 411, the first side portion 412 and the second side portion 413, all of which are perpendicular to each other, the liquid crystal panel 30 can be fixed on the backlight module 20 by the front frame structure 40 formed from the corner frame components 41, so as to be assembled into the LCD module. The segmented type of front frame structure 40 of the LCD module of the present invention can save material and achieve the object of compactness design. Besides, the front frame structure 40 can fit different size specifications of the LCD modules, so as to lower the cost of development, to short the time of development, and to decrease the manufacture cost.

Figure 5:
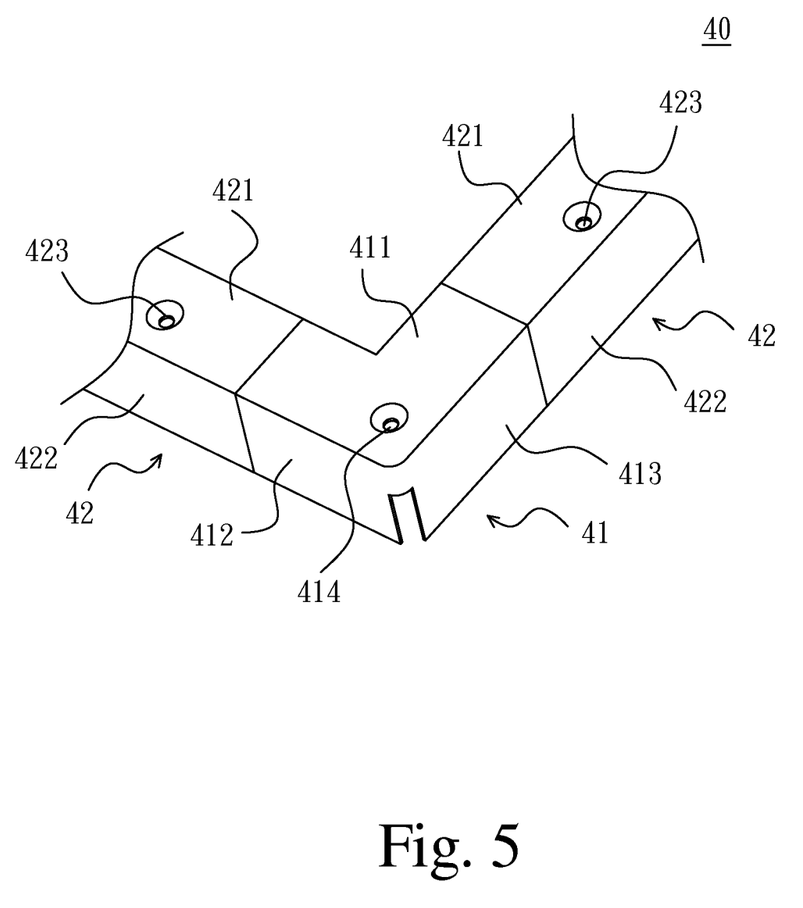
FIG. 5 is a perspective view of a front frame structure of a LCD module according to a second preferred embodiment of the present invention.
Figure 6:
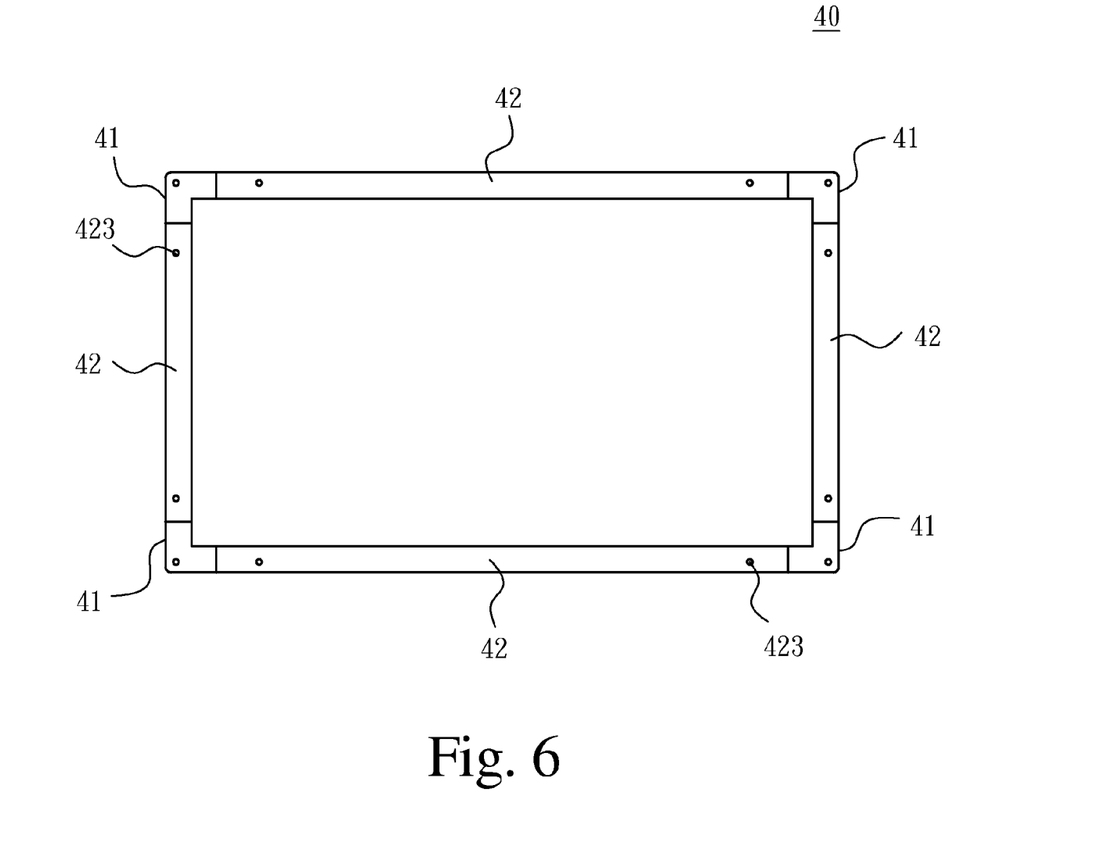
FIG. 6 is a top view of the front frame structure of the LCD module according to the second preferred embodiment of the present invention.

Referring now to FIG. 5 and FIG. 6, a perspective view of a front frame structure of a LCD module according to a second preferred embodiment of the present invention is illustrated in FIG. 5, and a top view of the front frame structure of the LCD module according to the second preferred embodiment of the present invention is illustrated in FIG. 6. The front frame structure 40 of the embodiment is similar to the front frame structure 40 in the first embodiment, so as to use similar terms and numerals of the foregoing embodiment. Except for the original corner frame components 41, the difference of this embodiment is that: the front frame structure 40 further comprises a plurality of middle frame components 42, so as to connect between the adjacent corner frame components 41. As shown in FIG. 5, the middle frame component 42 comprises a first flat 421 and a second flat 422, both of which are perpendicular to each other. The first flat 421 is connected with the corresponding top portion 411 of the adjacent corner frame component 41, and the second flat 422 is connected with the corresponding first side portion 412 or the second side portion 413 of the corner frame component 41.

Furthermore, the middle frame component 42 can be designed with different length to fit the LCD module having different size specifications, so as to achieve an object of helping to fix the liquid crystal panel 30 on the backlight module 20. The type of connecting the middle frame component 42 to the corner frame component 41 is not limited in the present invention, and the way of fixing the middle frame component 42 to the backlight module 20 is not limited too. For example, as shown in FIG. 5 and FIG. 6, the first flat 421 of the middle frame component 42 can be provided with a assembling hole 423, so that at least one fixing component (not shown) can pass through the assembling hole 423 to fix the middle frame component 42.

Figure 7:
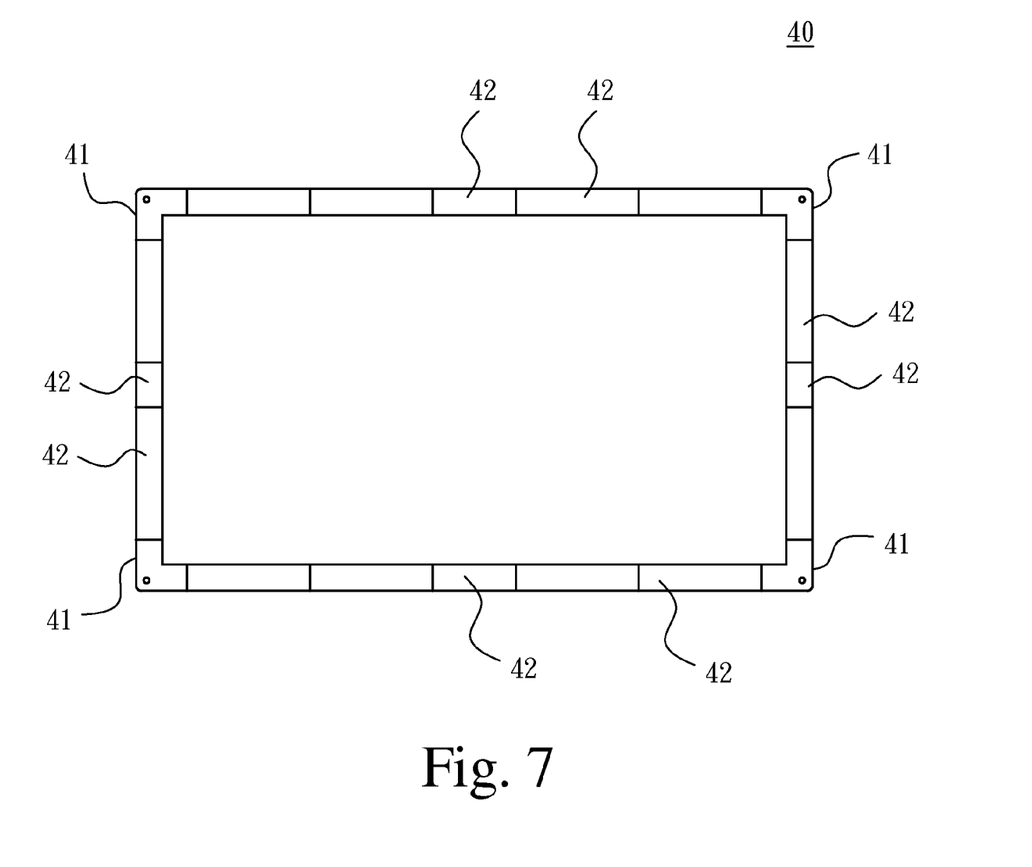
FIG. 7 is a top view of a front frame structure of a LCD module according to a third preferred embodiment of the present invention.

Referring now to FIG. 7, a top view of a front frame structure of a LCD module according to a third preferred embodiment of the present invention is illustrated in FIG. 7. The front frame structure 40 of this embodiment is similar to the front frame structure 40 in the second embodiment, so as to use similar terms and numerals of the foregoing embodiment. The difference of this embodiment is that the front frame structure 40 further comprises a plurality of middle frame assembles (unlabeled), so as to connect between the adjacent corner frame components 41. The middle frame assemble comprises a plurality of middle frame components 42, wherein the first flat 421 of the middle frame component 42 is connected with the corresponding top portion 411 of the adjacent corner frame component 41 or another adjacent first flat 421 of the middle frame component 42. Further, the second flat 422 of the middle frame component 42 is connected with the corresponding first side portion 412 or the second side portion 413 of the adjacent corner frame component 41, or is connected with another adjacent second flat 422 of the middle frame component 42. The flexibility of designing the front frame structure 40 can be increase by the multi-segmented type of middle frame constructed by the middle frame components 42. For example, most of the middle frame components 42 can be designed with the same length, and then to complement the needed length by the middle frame components 42 with a special length.

As described above, in comparison with the traditional LCD module that the sizes and material of the traditional LCD module is correspondingly increased with the continuous increasing of the types and sizes of the liquid crystal panels to thus be necessary to continuously develop new molds to increase the development cost of the LCD module and that the traditional front frame is almost made of the steel and thus the volume of the front frame and the weight thereof are larger to be disadvantageous to the compactness design of the LCD module, the front frame structure 40 of the present invention comprises a plurality of corner frame components 41, and the corner frame component 41 comprises a top portion 411, a first side portion 412 and a second side portion 413, all of which are perpendicular to each other. Each of the corner frame components 41 is fixed on a corner of the backlight module 20, and the liquid crystal panel 30 is fixed on the backlight module 20 by the corner frame components 41, so as to be assembled into the LCD module. The present invention can save material of the LCD module and achieve the object of the compactness design thereof, and can fit different size specifications of the LCD modules, so as to lower the cost of development, to short the time of development, and to decrease the manufacture cost.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A front frame structure of a liquid crystal display (LCD) module, the LCD module comprising a backlight module, a liquid crystal panel and a front frame structure, and the liquid crystal panel being disposed on a top surface of the backlight module; characterized in that: the front frame structure comprises four corner frame components; and each of the corner frame components comprises:
   a top portion being a plate and having a first edge and a second edge, both of which are perpendicular to each other;
   a first side portion being a portion vertically extended from the first edge of the top portion downward; and
   a second side portion being another portion vertically extended from the second edge of the top portion downward;
   wherein the top portion, the first side portion, and the second side portion are perpendicular to each other; each of the corner frame components having an L-shaped top-view profile is fixed on a corner of the backlight module and separated from the other corner frame components; and the liquid crystal panel is fixed on the backlight module by the corner frame components, so as to be assembled into the LCD module; and
   wherein the corner frame components are independently prefabricated components, and a space is formed between each of the two adjacent corner frame components to expose a corresponding side edge of the backlight module.

2. The front frame structure of the LCD module according to claim 1, characterized in that: the top portion of the corner frame component is provided with at least one assembling hole, and the backlight module is correspondingly provided with at least one fixing hole, wherein at least one fixing component passes through the assembling hole to fix the corner frame component.

3. The front frame structure of the LCD module according to claim 2, characterized in that: the fixing hole is a thread hole, and the fixing component is a screw bolt.

4. The front frame structure of the LCD module according to claim 1, characterized in that: the corner frame component is provided with a first engaging portion, and the backlight module is correspondingly provided with a second engaging portion, so as to fix the corner frame component by the engagement of the first engaging portion and the second engaging portion.

5. A liquid crystal display (LCD) module, comprising a backlight module, a liquid crystal panel, and a front frame structure, wherein the liquid crystal panel is disposed on a top surface of the backlight module; characterized in that: the front frame structure comprises four corner frame components; and each of the corner frame components comprises:
   a top portion being a plate and having a first edge and a second edge, both of which are perpendicular to each other;
   a first side portion being a portion vertically extended from the first edge of the top portion downward; and
   a second side portion being another portion vertically extended from the second edge of the top portion downward;
   wherein the top portion, the first side portion, and the second side portion are perpendicular to each other; each of the corner frame components having an L-shaped top-view profile is fixed on a corner of the backlight module and separated from the other corner frame components; and the liquid crystal panel is fixed on the backlight module by the corner frame components, so as to be assembled into the LCD module; and
   wherein the corner frame components are independently prefabricated components, and a space is formed between each of the two adjacent corner frame components to expose a corresponding side edge of the backlight module.

6. The LCD module according to claim 5, characterized in that:
   the top portion of the corner frame component is provided with at least one assembling hole, and the backlight module is correspondingly provided with at least one fixing hole, wherein at least one fixing component passes through the assembling hole to fix the corner frame component.

7. The LCD module according to claim 6, characterized in that: the fixing hole is a thread hole, and the fixing component is a screw bolt.

8. The LCD module according to claim 5, characterized in that:
   the corner frame component is provided with a first engaging portion, and the backlight module is correspondingly provided with a second engaging portion, so as to fix the corner frame component by the engagement of the first engaging portion and the second engaging portion.

* * * * *